No. 631,294. Patented Aug. 22, 1899.
A. GERSTNER.
VEHICLE WHEEL.
(Application filed Nov. 5, 1896. Renewed Apr. 27, 1899.)

(No Model.)

Witnesses:—
Matthew Fletcher
George Barry Jr.

Inventor
August Gerstner
by attorneys
Brown & Seward

UNITED STATES PATENT OFFICE.

AUGUST GERSTNER, OF NEW YORK, N. Y.

VEHICLE-WHEEL.

SPECIFICATION forming part of Letters Patent No. 631,294, dated August 22, 1899.

Application filed November 5, 1896. Renewed April 27, 1899. Serial No. 714,699. (No model.)

*To all whom it may concern:*

Be it known that I, AUGUST GERSTNER, of New York, (Brooklyn,) in the county of Kings and State of New York, have invented a new and useful Improvement in Vehicle-Wheels, of which the following is a specification.

My invention relates to an improvement in vehicle-wheels, and more particularly relates to the construction of the fellies or rims thereof.

The object of my present invention is to provide a very simple and effective device in which the rim consists of an inner annular rim-section and an outer annular rim-section removably secured thereto. Some of the advantages and reasons for thus constructing the rim are as follows: When one or more spokes are broken and it is wished to replace them with new spokes, they may be replaced by removing the outer rim-section from the inner rim-section, thereby doing away with the necessity of tearing the tire from its seat in the outer rim-section. Furthermore, racing-tires and road-tires may be readily interchanged for use upon the wheels where this invention is used in connection with bicycle-wheels by simply providing the tires with their respective outer rim-sections and by inserting the tires desired and the outer sections to which they are attached to the inner rim-sections and securing them in position thereon. Again, because of this removable feature of the outer rim-section, the tire, whether it be pneumatic, cushion, or otherwise, may be glued or secured permanently to the outer rim-section, while the tires in use with the present solid rims are required to be secured to the rims so lightly that they may be torn from their seats when it is desired to get at the spokes or for other causes.

A still further advantage is that the manufacturer of the tire may fasten his tire to the outer section of the rim before it leaves the factory and before it has had time to shrink. This advantage is a very important one, as it is well known in the trade that after the tires have been hung up for some time—say a month or two—the tires shrink so much it is very difficult to stretch them over the edges of the rim, and it is known that this stretching of the tire hurts it very much and tends also to make it porous.

A practical embodiment of my invention is represented in the accompanying drawings, in which—

Figure 1:
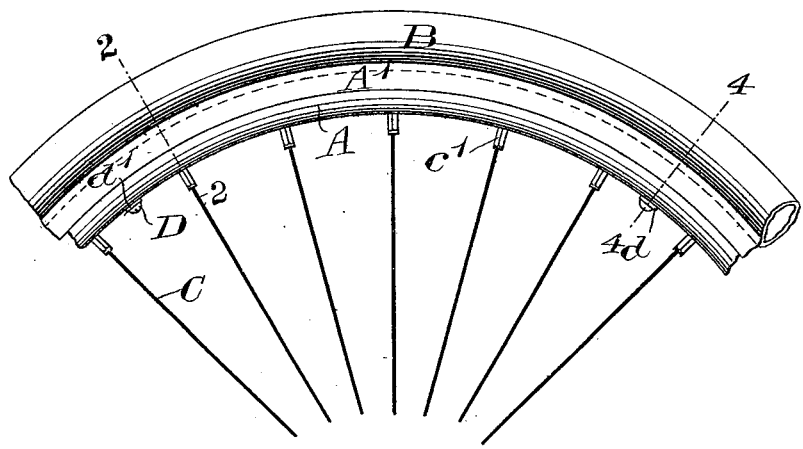
Figure 2:
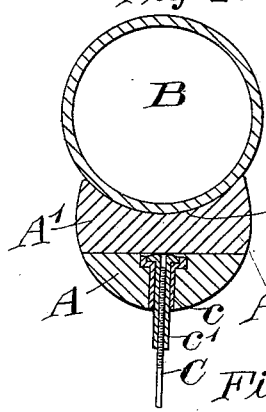
Figure 3:
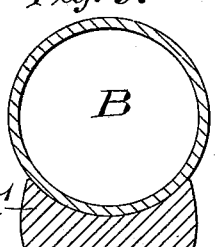
Figure 4:
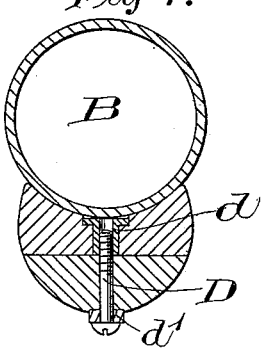
Figure 5:
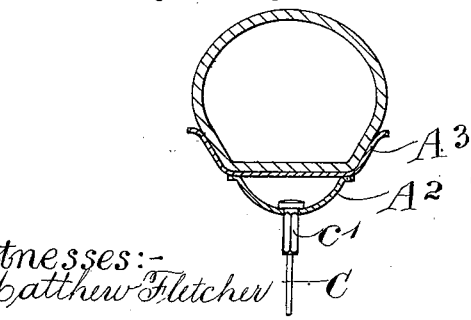

Figure 1 represents a side view of the portion of a vehicle-wheel embodying my invention. Fig. 2 is an enlarged cross-section on the line 2 2 of Fig. 1. Fig. 3 is a section similar to Fig. 2, showing the manner of removing the outer rim-section and its attached tire from engagement with the inner rim-section. Fig. 4 is an enlarged cross-section on the line 4 4 of Fig. 1, the means for securing the outer section to the inner section being clearly shown therein. Fig. 5 is a cross-section of a modified form of rim, the inner and outer sections being shown in their assembled position; and Fig. 6 is a view of the same, showing the manner of removing the outer rim-section from the inner rim-section.

The rim or felly of the wheel consists of an inner annular rim-section A and an outer annular rim-section A'. The outer annular rim-section A' is adapted to receive a suitable tire thereon. In the present instance the said outer annular rim-section is provided with a circumferential groove $a$, within which is permanently secured a pneumatic tire B. The inner wall of the outer rim-section is fitted to the outer wall of the inner rim-section, so that when two rim-sections are in position they form a complete rim or felly. The outer rim-section may be slid off from the inner rim-section sidewise when it is desired to remove it therefrom. The sockets $c$ for the reception of the tightening-nuts $c'$ of the spokes C are secured within the inner rim-section A in such a position that when the outer rim-section is removed from engagement with the inner rim-section the said tightening-nuts $c'$ may be readily removed from the said inner rim-section A through its outer wall.

The means which I have employed for removably securing the outer rim-section to the inner rim-section are as follows: A screw-threaded socket-piece $d$ is secured permanently within the outer rim-section A', which screw-threaded socket is adapted to receive the end of a locking-screw D, which passes from the inner wall of the inner rim-section A entirely therethrough. If desired, a suitable washer $d'$ may be interposed between the inner wall of the inner rim-section and the head of the screw D, so that when the screw is screwed home to securely lock the outer rim-section to the inner rim-section the tendency on the part of the inner rim-section to split is obviated. I may provide any number of these locking devices, the number which I preferably employ being about four for each wheel.

Figure 6:
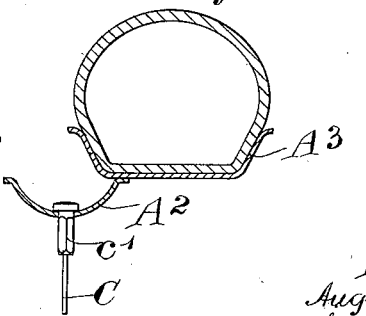

In the form shown in Figs. 5 and 6 I have shown the rim or felly as made up of two metal rim-sections, the outer section $A^3$ being of flattened-U form, and the inner rim-section $A^2$ of bow form, in cross-section. By constructing the felly or rim as above described broken spokes may be very quickly and easily replaced by new ones, as the tightening-nuts $c'$ are easily accessible by simply sliding the outer rim-section off to one side, the said tightening-nuts $c'$ being at all times free to be easily turned, while in the old construction, where the said tightening-nut $c'$ went through to the seat of the tire, the tire would have first to be removed from its seat and the glue or cement scraped off from the top of the nut before the nut could be removed from the rim.

It is evident that slight changes may be resorted to in the construction or arrangement of the several parts without departing from the spirit and scope of my invention, whereas I do not wish to limit myself strictly to the structure herein set forth; but

What I claim is—

In a wheel, a felly consisting of an inner annular rim-section and a removable outer annular rim-section having its inner wall fitted directly to the outer wall of the inner rim-section, means for removably securing the outer rim-section to the inner rim-section, tension-spokes secured at their outer ends to the inner rim-section and a tire permanently secured to the outer wall of the outer rim-section, substantially as set forth.

AUGUST GERSTNER.

Witnesses:
FREDK. HAYNES,
EDWARD VIESER.